United States Patent
Levinson (10) Patent No.: US 12,484,765 B2
(45) Date of Patent: Dec. 2, 2025

(54) MODULAR ENDOSCOPE WITH A BAYONET CONNECTION

(71) Applicant: Marc A. Levinson, Palo Alto, CA (US)

(72) Inventor: Marc A. Levinson, Palo Alto, CA (US)

( * ) Notice: Subject to any disclaimer, the term of this patent is extended or adjusted under 35 U.S.C. 154(b) by 565 days.

(21) Appl. No.: 17/947,290

(22) Filed: Sep. 19, 2022

(65) Prior Publication Data

US 2023/0172433 A1 Jun. 8, 2023

Related U.S. Application Data (63) Continuation-in-part of application No. 15/731,905, filed on Aug. 17, 2017, now Pat. No. 11,445,890.

(51) Int. Cl.
| | |
|---|---|
| *A61B 1/00* | (2006.01) |
| *A61B 1/015* | (2006.01) |
| *A61B 1/018* | (2006.01) |
| *A61B 1/05* | (2006.01) |
| *A61B 1/06* | (2006.01) |
| *A61B 1/07* | (2006.01) |

(52) U.S. Cl.
CPC ...... *A61B 1/00105* (2013.01); *A61B 1/00016* (2013.01); *A61B 1/00096* (2013.01); *A61B 1/00098* (2013.01); *A61B 1/00128* (2013.01); *A61B 1/015* (2013.01); *A61B 1/018* (2013.01); *A61B 1/05* (2013.01); *A61B 1/0638* (2013.01); *A61B 1/0655* (2022.02); *A61B 1/0669* (2013.01); *A61B 1/0676* (2013.01); *A61B 1/0684* (2013.01); *A61B 1/07* (2013.01)

(58) Field of Classification Search
CPC ............ A61B 1/00105; A61B 1/00016; A61B 1/00098; A61B 1/018; A61B 1/05; A61B 1/0669; A61B 1/0676; A61B 1/0684; A61B 1/0052; A61B 1/00066
See application file for complete search history.

(56) References Cited

U.S. PATENT DOCUMENTS

| | | | | |
|---|---|---|---|---|
| 4,345,589 A | * | 8/1982 | Hiltebrandt | A61B 1/00135 600/114 |
| 4,919,112 A | * | 4/1990 | Siegmund | A61B 1/0052 600/146 |
| 5,125,394 A | * | 6/1992 | Chatenever | A61B 1/04 600/162 |
| 5,205,280 A | * | 4/1993 | Dennison, Jr. | A61B 1/00128 403/DIG. 4 |
| 5,291,010 A | * | 3/1994 | Tsuji | A61B 1/051 600/109 |
| 5,311,859 A | * | 5/1994 | Monroe | A61B 1/042 396/17 |

(Continued)

*Primary Examiner* — Anh Tuan T Nguyen
*Assistant Examiner* — Shankar Raj Ghimire
(74) *Attorney, Agent, or Firm* — Dana Legal Services; Jubin Dana (57) ABSTRACT

A modular endoscope including a handle and sheath that can be coupled or uncoupled using a bayonet connection. For example, when the handle and sheath are mated or coupled, the sheath has deflecting capability and tip angulation can be accomplished through the handle. The tip of the sheath is capable of being deflected to allow the tip to be pointed in a specific direction. The tip of the sheath, which is distal from the location where the sheath is coupled to the handle, includes an illumination element, an image capture element.

18 Claims, 11 Drawing Sheets

(56) References Cited

U.S. PATENT DOCUMENTS

| | | | | |
|---|---|---|---|---|
| 5,368,014 A * | 11/1994 | Anapliotis | A61B 1/00135 | 600/162 |
| 5,402,768 A * | 4/1995 | Adair | A61B 1/00158 | 600/110 |
| 5,624,430 A * | 4/1997 | Eton | A61M 25/0127 | 606/1 |
| 5,682,199 A * | 10/1997 | Lankford | A61B 1/05 | 600/200 |
| 5,704,892 A * | 1/1998 | Adair | A61B 1/015 | 600/125 |
| 5,813,996 A * | 9/1998 | St. Germain | A61M 25/0905 | 604/533 |
| 5,895,350 A * | 4/1999 | Hori | A61B 1/0607 | 600/109 |
| 5,984,861 A * | 11/1999 | Crowley | A61B 5/0084 | 600/179 |
| 6,001,058 A * | 12/1999 | Sano | A61B 1/0669 | 600/178 |
| 6,004,263 A * | 12/1999 | Nakaichi | A61B 1/0607 | 600/179 |
| 6,520,908 B1 * | 2/2003 | Ikeda | A61B 1/00066 | 600/110 |
| 6,554,765 B1 * | 4/2003 | Yarush | A61B 1/00108 | 600/109 |
| 6,960,161 B2 * | 11/2005 | Amling | A61B 1/00119 | 600/110 |
| 7,214,183 B2 * | 5/2007 | Miyake | A61B 1/0051 | 600/130 |
| 7,399,275 B2 * | 7/2008 | Goldfain | A61B 1/00188 | 600/176 |
| 8,029,439 B2 * | 10/2011 | Todd | A61B 1/0653 | 362/572 |
| 8,702,602 B2 * | 4/2014 | Berci | A61B 90/30 | 600/101 |
| 9,107,573 B2 * | 8/2015 | Birnkrant | A61B 1/00066 | |
| 9,131,956 B2 * | 9/2015 | Shaughnessy | A61M 25/0662 | |
| 9,517,184 B2 * | 12/2016 | Branconier | A61J 15/0003 | |
| 10,051,166 B2 * | 8/2018 | Duckett, III | A61B 1/00105 | |
| 10,163,309 B1 * | 12/2018 | Shelton, IV | H02J 7/00 | |
| 10,729,315 B2 * | 8/2020 | Harrah | A61B 1/0605 | |
| 2003/0135136 A1 * | 7/2003 | Murakami | A61B 18/1445 | 601/2 |
| 2004/0054254 A1 * | 3/2004 | Miyake | A61B 1/0051 | 600/104 |
| 2004/0260303 A1 * | 12/2004 | Carrison | A61B 17/3472 | 606/92 |
| 2006/0173245 A1 * | 8/2006 | Todd | A61B 1/0653 | 600/178 |
| 2006/0287576 A1 * | 12/2006 | Tsuji | A61B 1/00105 | 600/132 |
| 2008/0125628 A1 * | 5/2008 | Ueno | G02B 23/2453 | 600/130 |
| 2008/0214896 A1 * | 9/2008 | Krupa | A61B 1/0653 | 600/141 |
| 2009/0018392 A1 * | 1/2009 | Scholly | G02B 23/26 | 600/109 |
| 2010/0191053 A1 * | 7/2010 | Garcia | A61B 1/0057 | 600/109 |
| 2012/0004503 A1 * | 1/2012 | Kawaura | A61B 1/00128 | 600/104 |
| 2012/0100729 A1 * | 4/2012 | Edidin | H01R 13/622 | 439/38 |
| 2012/0238813 A1 * | 9/2012 | Ashida | A61B 1/0125 | 600/114 |
| 2012/0289858 A1 * | 11/2012 | Ouyang | A61B 1/00101 | 600/562 |
| 2013/0144123 A1 * | 6/2013 | Nakamura | A61B 1/0016 | 600/114 |
| 2013/0172679 A1 * | 7/2013 | Ashida | A61B 1/051 | 600/114 |
| 2013/0197307 A1 * | 8/2013 | Ashida | A61B 1/00148 | 600/114 |
| 2013/0261391 A1 * | 10/2013 | Dejima | A61B 1/0016 | 600/114 |
| 2014/0012084 A1 * | 1/2014 | Naito | A61M 25/0113 | 600/114 |
| 2014/0107416 A1 * | 4/2014 | Birnkrant | A61B 1/00124 | 600/110 |
| 2014/0296633 A1 * | 10/2014 | Gumbs | A61B 1/0057 | 600/109 |
| 2016/0038012 A1 * | 2/2016 | McMahon | A61B 1/06 | 600/210 |
| 2016/0128550 A1 * | 5/2016 | Laser | A61B 1/042 | 600/109 |
| 2019/0029497 A1 * | 1/2019 | Mirza | A61B 1/0684 | |
| 2019/0167374 A1 * | 6/2019 | Calavrezos | A61B 1/0014 | |
| 2021/0145257 A1 * | 5/2021 | Levinson | A61B 1/00066 | |
| 2022/0079418 A1 * | 3/2022 | Ouyang | A61B 1/0016 | |
| 2022/0192471 A1 * | 6/2022 | Levy | A61B 1/00135 | |
| 2022/0273165 A1 * | 9/2022 | Ouyang | A61B 1/0646 | |
| 2022/0378279 A1 * | 12/2022 | Poll | A61B 1/00179 | |
| 2023/0070386 A1 * | 3/2023 | Koubi | A61B 1/00105 | |
| 2023/0108695 A1 * | 4/2023 | Ulmschneider | A61B 1/00009 | 600/160 |
| 2023/0123867 A1 * | 4/2023 | Herda | A61B 50/33 | 600/168 |
| 2024/0252269 A1 * | 8/2024 | Wakana | A61B 34/37 | |
| 2024/0335095 A1 * | 10/2024 | Cruz Trabanino | A61B 1/00181 | |

* cited by examiner

DETAIL A

MODULAR ENDOSCOPE WITH A BAYONET CONNECTION

CROSS-REFERENCE TO RELATED APPLICATION

This application is a continuation-in-part of U.S. Pat. No. 11,445,890 (U.S. Non-Provisional application Ser. No. 15/731,905) titled MODULAR ENDOSCOPE and filed Aug. 17, 2017 by Marc LEVINSON, the entire disclosure of which is incorporated herein by reference.

TECHNICAL FIELD

The present invention relates to medical devices and more specifically to modular endoscopes.

BACKGROUND

Endoscopes are medical devices used to visually observe an internal body anatomy for the diagnosis and/or treatment of medical conditions. The scope will include a handle that controls the elements of the scope. Endoscopes generally include the following elements:

1. An illumination component of a device terminating at the tip allowing illumination of an internal area.
2. An imaging optic also at the tip allowing image capture of the internal area. The imaging optic may be an optical fiber, rod lens scope design, and/or an imaging sensor.
3. Auxiliary channel(s). This channel(s) allows, for example, introduction of a fluid (such as saline or a fluid containing a pharmaceutical compound) to be added or gas/air (i.e., $CO_2$). Alternatively, the auxiliary channel(s) could allow introduction of a needle for a biopsy or other tool. Some endoscopes do not include an auxiliary channel(s).

Endoscopes are used in a number of medical specialties, including urology, gynecology, general surgery, intubation, arthroscopy gastroenterology and otolaryngology. Additional specialties include neurosurgery, spine surgery, cardiology, cardiovascular surgery, and pulmonology.

Endoscopes present a number of technical challenges. A first technical challenge is reprocessing, which includes cleaning, disinfecting, and sterilization. The instrument will be introduced into a patient's body and thus requires reprocessing between patients. Although some surgical tools can be inexpensively heat sterilized, not all endoscopes, which are made of differing materials, are not adaptable to heat sterilization and instead must be sterilized by low temperature chemicals or other means. A second technical challenge is reliability. If the reprocessing process degrades the performance or reliability of an endoscope, an alternative practice is to simply use the endoscope a single time. The device is provided in a sterile, sealed package. However, this presents a third challenge, cost, which is greatly increased if an entire endoscope must be discarded after a single use. It is an object of the embodiments to improve on the current technology to address these technical and cost challenges.

SUMMARY

The present described embodiments have a number of advantages, including cost reduction, simplification of, elimination of, reduction of, or minimizing reprocessing, and reliability. The embodiments describe a modular endoscope that includes a handle and a sheath or a shaft, which are used interchangeably herein. The sheath has a proximal coupling end that may be joined to the handle and a distal tip end. The sheath may be rigid, semi-rigid, or flexible, as selected by requirement for a procedure. A coupling mechanism joins the handle to the sheath. An image sensor is mounted on the tip of the sheath. The image sensor could be connected by a wired connection through the sheath, to the handle, and then to a display. Alternatively, the image sensor may be wireless, allowing still images or video to be collected directly onto a system external to the endoscope. The tip end also includes an illumination source. This illumination source may be an LED at the tip of the sheath (along with a power source). Alternatively and in accordance with some embodiments, an LED is embedded or located at the sheath and a light fiber bundle carries/transfers light down the light fiber bundle of the sheath thereby transmitting light to the tip to illuminate the area in front of the tip of the sheath by bringing light from the LED to the tip to illuminate the area in front of the tip of the sheath. Alternatively and in accordance with some embodiments, the illumination source may be an LED in the handle. The LED emits light onto a light fiber bundle in the sheath, which runs to the tip end of the sheath, thereby illuminating the area in front of the tip of the sheath. For sheaths that are flexible or rigid with flexible tip configurations, the deflecting mechanism allows the tip to be angularly deflected to allow a wider view of an internal area. Depending on the embodied design, this deflection could be up to 280 degrees in one or more directions (e.g., left/right, up/down, etc.). The endoscope sheath may include an auxiliary channel(s) having a first end proximate to the coupling end of the sheath, and a second end terminating to the tip end of the sheath. This auxiliary channel(s) allows a fluid or a surgical tool or component to be introduced through to the tip end of the sheath.

BRIEF DESCRIPTION OF THE DRAWINGS

The foregoing summary as well as the following detailed description is better understood when read in conjunction with the appended drawings. For the purpose of illustrating the invention, there is shown in the drawings embodiments in accordance with various aspects of the invention. However, the invention is not limited to the specific embodiments and methods disclosed. In the drawing figures.

DETAILED DESCRIPTIONS

The following describes various non-limiting examples of the present technology that illustrate various aspects and embodiments of the invention. Generally, examples can use the described aspects in any combination. All statements herein reciting principles, aspects, and non-limiting examples, are intended to encompass both structural and functional equivalents thereof. Additionally, it is intended that such equivalents include both currently known equivalents and equivalents developed in the future, i.e., any elements developed that perform the same function, regardless of structure.

It is noted that, as used herein, the singular forms "a," "an" and "the" include plural referents unless the context clearly dictates otherwise. Reference throughout this specification to "one," "an," "certain," "various," and "cases," "examples," "non-limiting examples," or similar language means that a particular aspect, feature, structure, or characteristic described in connection with the example is included in at least one embodiment of the invention. Thus, appearances of the phrases "in one case," "in at least one example," "in an example," "in a non-limiting example." "in certain cases," and similar language throughout this specification may, but do not necessarily, all refer to the same embodiment or similar embodiments. Furthermore, aspects and non-limiting examples of the invention described herein are merely exemplary, and should not be construed as limiting of the scope or spirit of the invention as appreciated by those of ordinary skill in the art. The disclosed invention is effectively made or used in any example, which are all intended to be non-limiting examples, that includes any novel aspect described herein. Furthermore, to the extent that the terms "including", "includes", "having", "has", "with", or variants thereof are used in either the detailed description and the claims, such terms are intended to be inclusive in a similar manner to the term "comprising." With reference to FIG. 1, a complete endoscope includes a handle 17 and a sheath 1. The endoscope's handle 17 couples to a sheath 1 in this embodiment allowing for sheath tip 4 control (i.e., active scope tip deflection). The handle locking knob 14 locks the handle 17 onto the sheath 1 once the components (handle and sheath) adjoined at the coupling mechanism interface. On the sheath 1, near the coupling end, there is a strain relief 2, to facilitate support of the bending of the sheath 1. The handle control cable 13 attaches the handle 17 to a computer or cell and power source, which is then connected (wired or wirelessly) to a monitor or display. The sheath 1 terminates in tip end 4.

Figure 1:
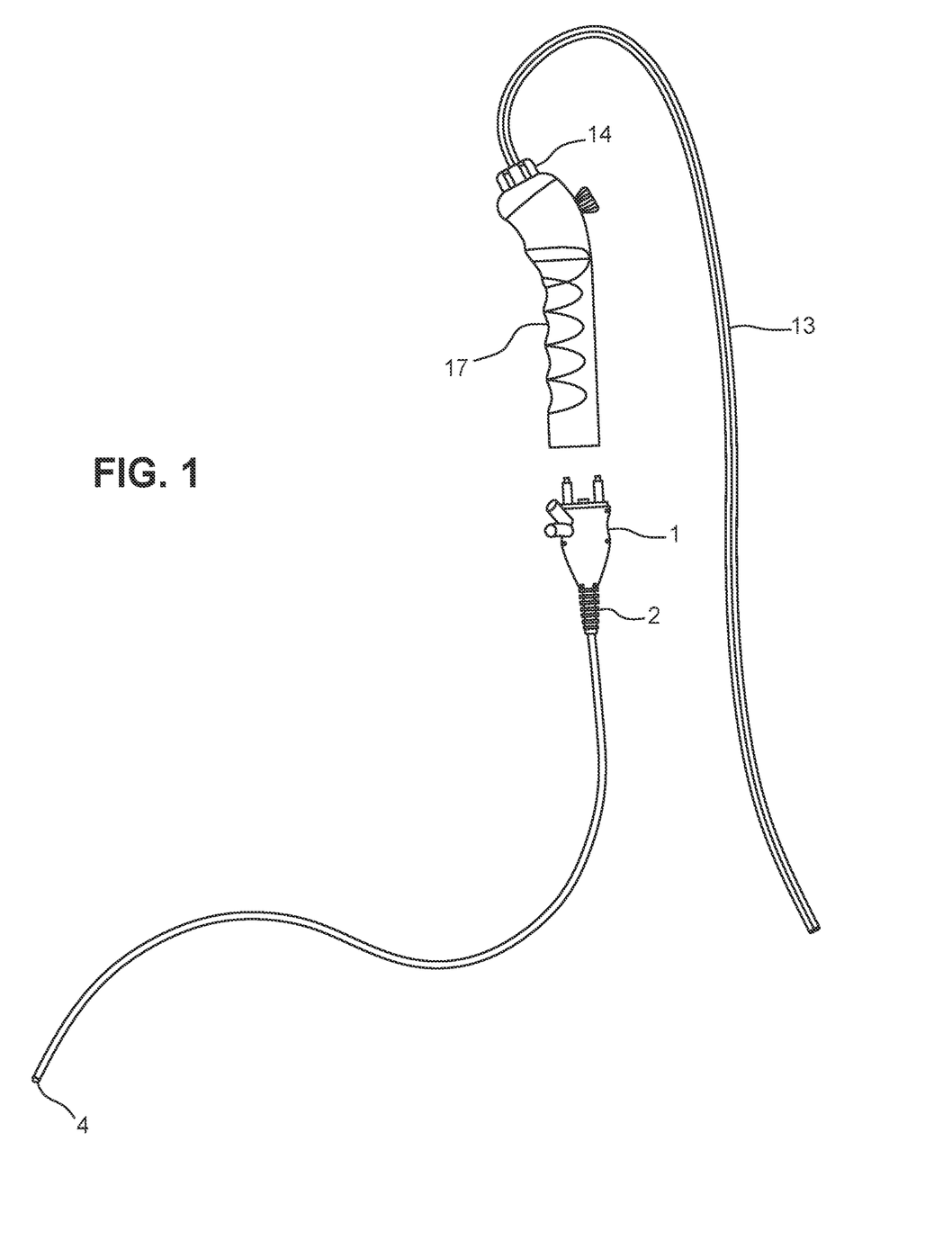
FIG. 1 is a side view of a handle and sheath embodiment.

This mating also allows for powering of the camera/ visualization scope function and the lighting (i.e., Light Emitting Diodes (LED's)). As mentioned previously and in accordance with various embodiments, the sheath 1 may be rigid (no appreciable bending), semi-rigid (bending resistant, but slight bend possible), flexible (able to bend) or a hybrid (part rigid/semi-rigid and flexible). The tip 4 of the sheath 1 (i.e., scope tip end) will be capable of deflecting in one or more directions and up to 280° depending on endoscope design. As non-limiting examples, for both flexible ureteroscopes and the hysteroscope, the tip will deflect in two opposing directions in the same plane. In the example of the ureteroscope, the deflection is up/down. In the example of the hysteroscope, the deflection is left/right. There will be times when the user will need to move, deflect, or rotate a tip 4, which the user will do by twisting the handle 17. This will rotate the sheath 1 in a close ratio of 1:1 with the handle 17.

Figure 2:
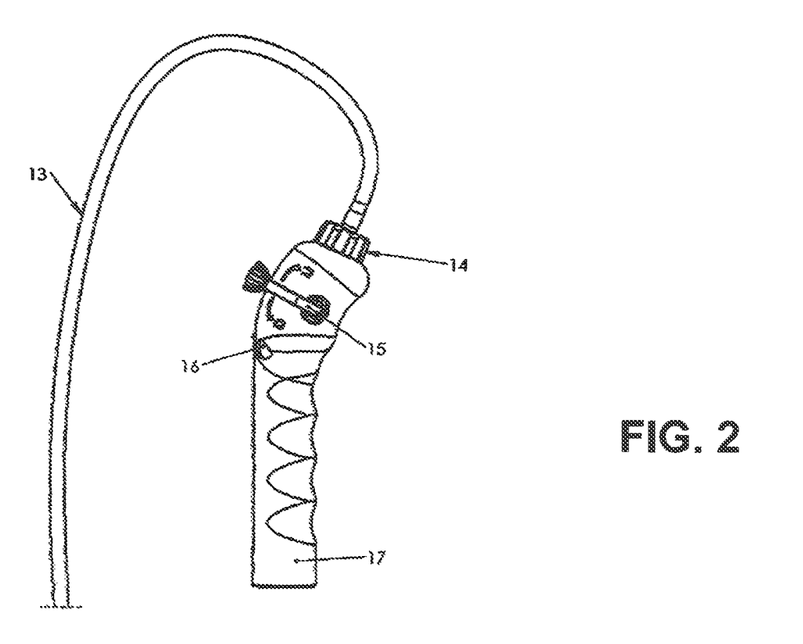
FIG. 2 is a side view of a handle embodiment.

With reference to FIG. 2 The handle 17 is shown with sheath assembly locking knob 14. Rotation of this knob allows mechanical connection of the handle 17 to the sheath 1 as shown in FIG. 1. A steering actuation lever 15 allows angular aiming of the tip 4 of the sheath 1, as shown in FIG. 1. Electronic control buttons 16 allow activation of various features of the endoscope. In one embodiments three such buttons are used, one to control power to the lighting source (e.g. LED), one to capture still pictures, and one to capture video.

Figure 3:
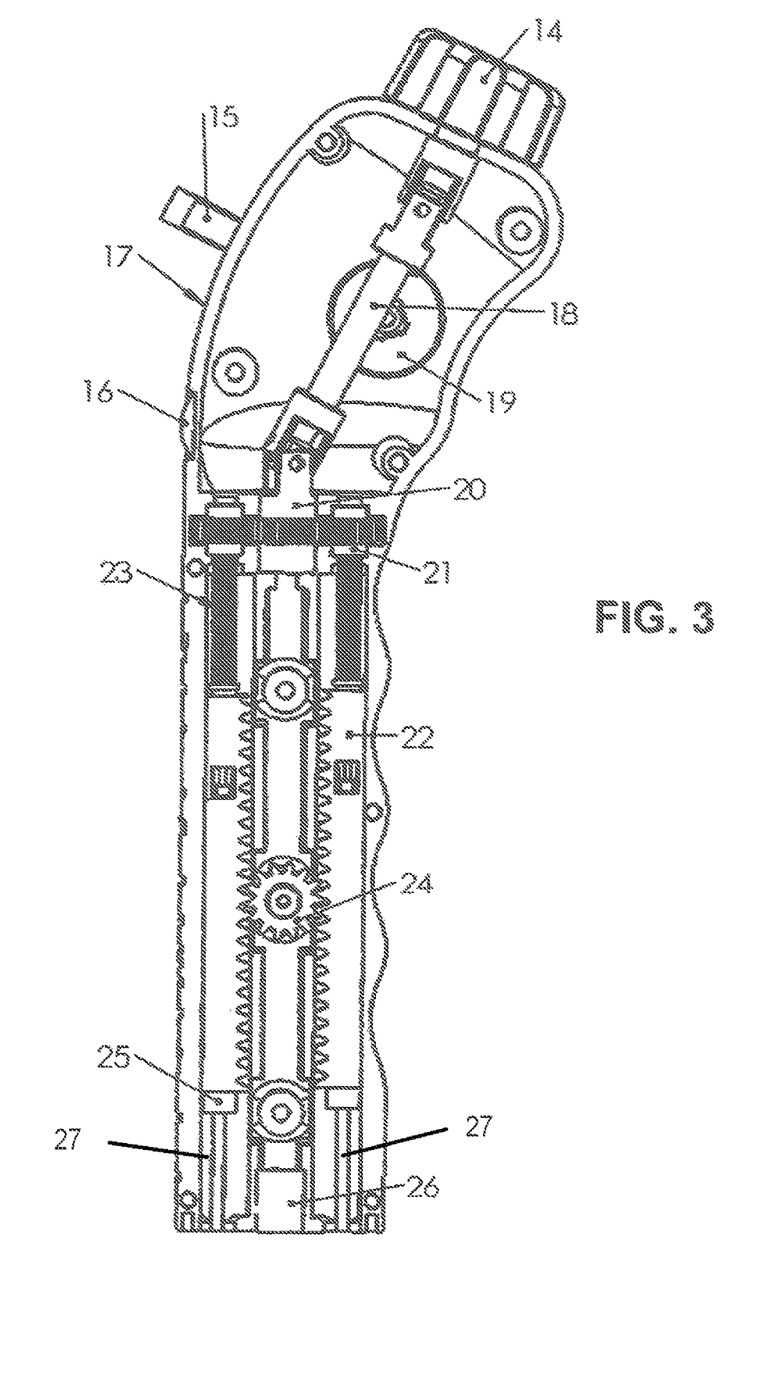
FIG. 3 is a cross sectional view of a handle embodiment.

With reference to FIG. 3, the handle 17 is shown in cross section. The steering actuation lever 15, for control the sheath tip, is linked to steering wire pull wheel 19. On pull wheel 19 is mounted pull wire 27. The ends of pull wire 27 are affixed at the tip end of the sheath 1. Actuation of lever 15 moves pull wheel 19, pulling on an end of pull rack gear wire 27. This allows angular deflection of the tip of the sheath 1 in a plane.

The handle locking knob 14 is joined to locking joint assembly 18 connected to locking gear joint 20. Rotation of gear joint 20 engages sliding spline gear 21 on locking spline 23. This moves gear rack 22 on rack following gear 24 locking rack spline sleeve 25 into the sheath 1. At the end of handle 17 is the handle side electrical connector 26, in electrical connection with buttons 16 and to the existing cable that connects to a camera control unit (ccu) and power.

Figure 4:
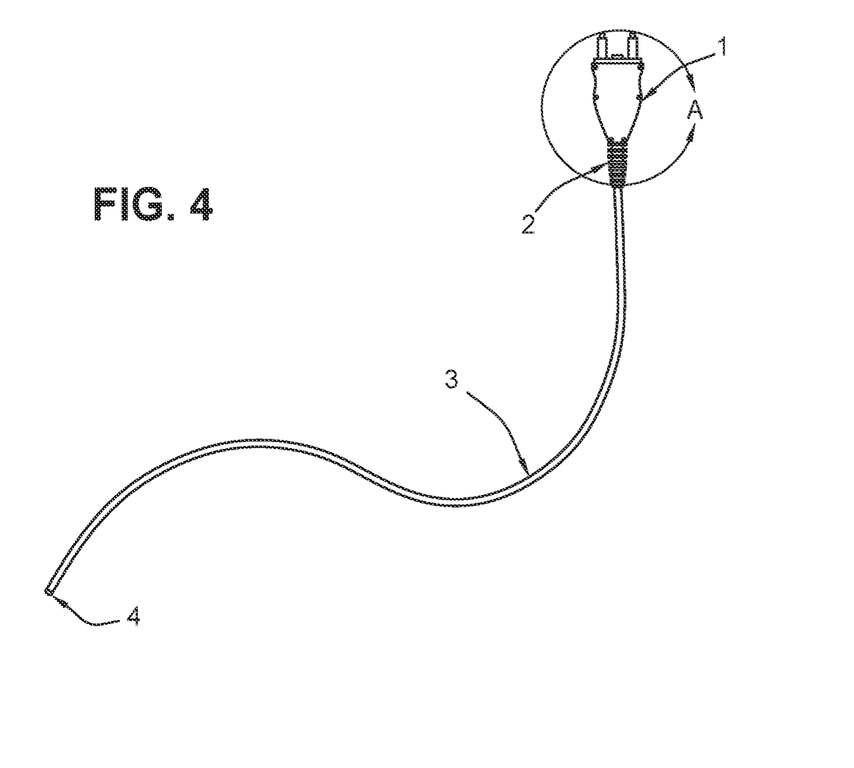
FIG. 4 is a side view of a sheath.
Figure 5:
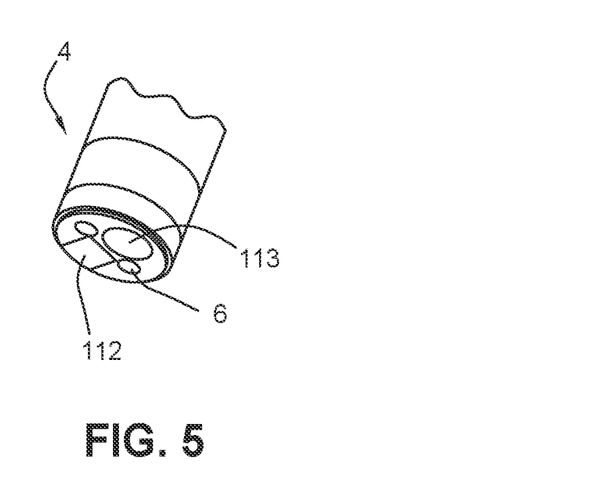
FIG. 5 is a detail of the tip end of the sheath.

With reference to FIG. 4, the sheath 1 is shown with strain relief 2 at the end of the connector portion, the flexible reinforced shaft body 3 of sheath 1 and a terminal tip 4. The terminal tip 4 is shown in FIG. 5, having a terminal light fiber bundles 6 and a camera sensor 112. The end of auxiliary channel 113 is also shown. This channel allows for infusion/evacuation of water or saline/lactate ringer's solution and/or other fluid substances (e.g., medication or drugs) as well as introduction of gas or air, including after irrigation, as well as use of a surgical tool.

In addition, the sheath may incorporate a single or multiple integrated channels to be used for introduction/withdrawal of various surgical tools and/or infusion/evacuation of water or saline/lactate ringer's solution and/or other fluid substances (e.g., drugs).

The endoscope's imaging platform will be produced via an integrated color CMOS sensor (and complementary objective lens) located at the distal end of the sheath tip 4. The processing of the signal will either be completed within the endoscope's body (to include sheath and handle) that is wired directly to a remote camera processor unit that is connected to a display (i.e., monitor (e.g., integrated small monitor, stand-alone monitor, computer, tablet, cell phone, etc.)) or transmitted wirelessly to a display (i.e., monitor). Light will be produced through an integrated powered LED(s) placed at the distal end of the endoscope or in the proximal end of the sheath, where emitted light is transmitted down a light fiber bundle bringing light from the LED to the tip to illuminate the area in front of the tip of the sheath. In some embodiments, the LED is positioned within the handle where the emitted light is transmitted down a light fiber bundle embedded within the sheath, thereby allowing for exiting of light at the tip end of the endoscope. In some embodiments, the endoscope will be wired directly to a remote power source (i.e., AC power). In some embodiments, the endoscope is powered by an integrated rechargeable battery for wireless designed endoscopes.

With reference to FIGS. 7A-7F, the connection between handle 17 and sheath 1 is shown in accordance with various aspects and embodiments of the invention. In accordance with some embodiments, the pull wire 27 has a handle wire section 27a and a sheath wire section 27b. In accordance with various aspects and embodiments, an auxiliary channel 70 having an auxiliary channel valve 72 are shown.

Figure 7A:
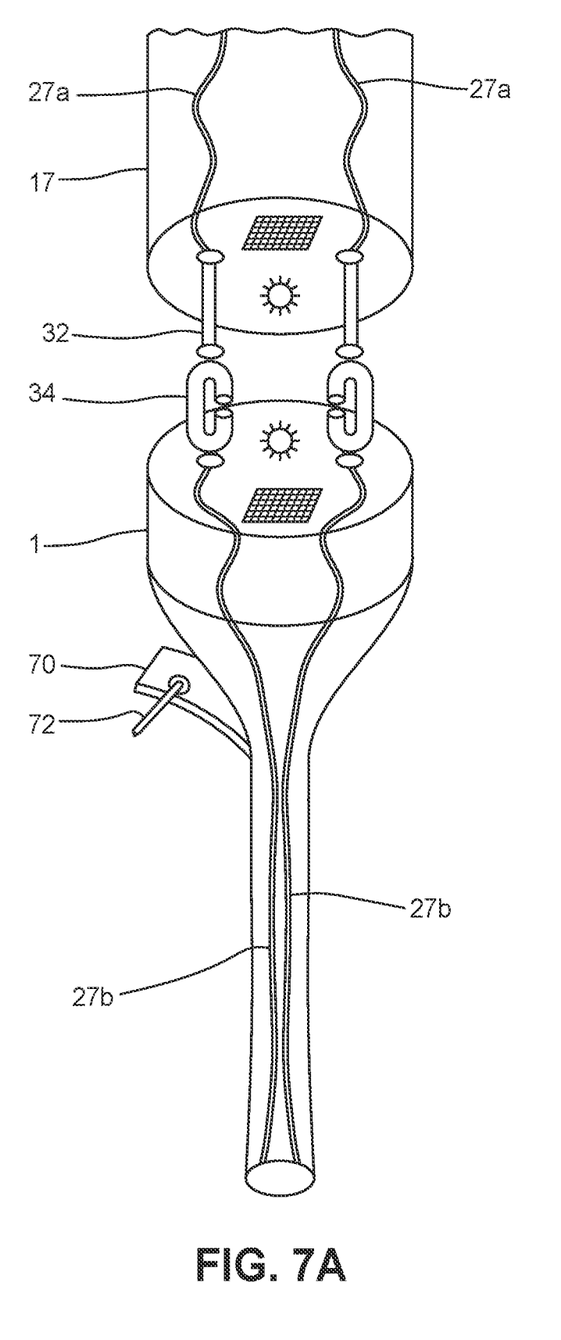
FIG. 7A is a side perspective view of a ball and socket connection embodiment between the handle and sheath.

FIG. 7A shows a ball 32 capable of engaging or being joined to a socket 34 in accordance with some embodiments of the invention. The ball and socket placement, with respect to the handle, is arbitrary and could be switched from handle or sheath side.

Figure 7B:
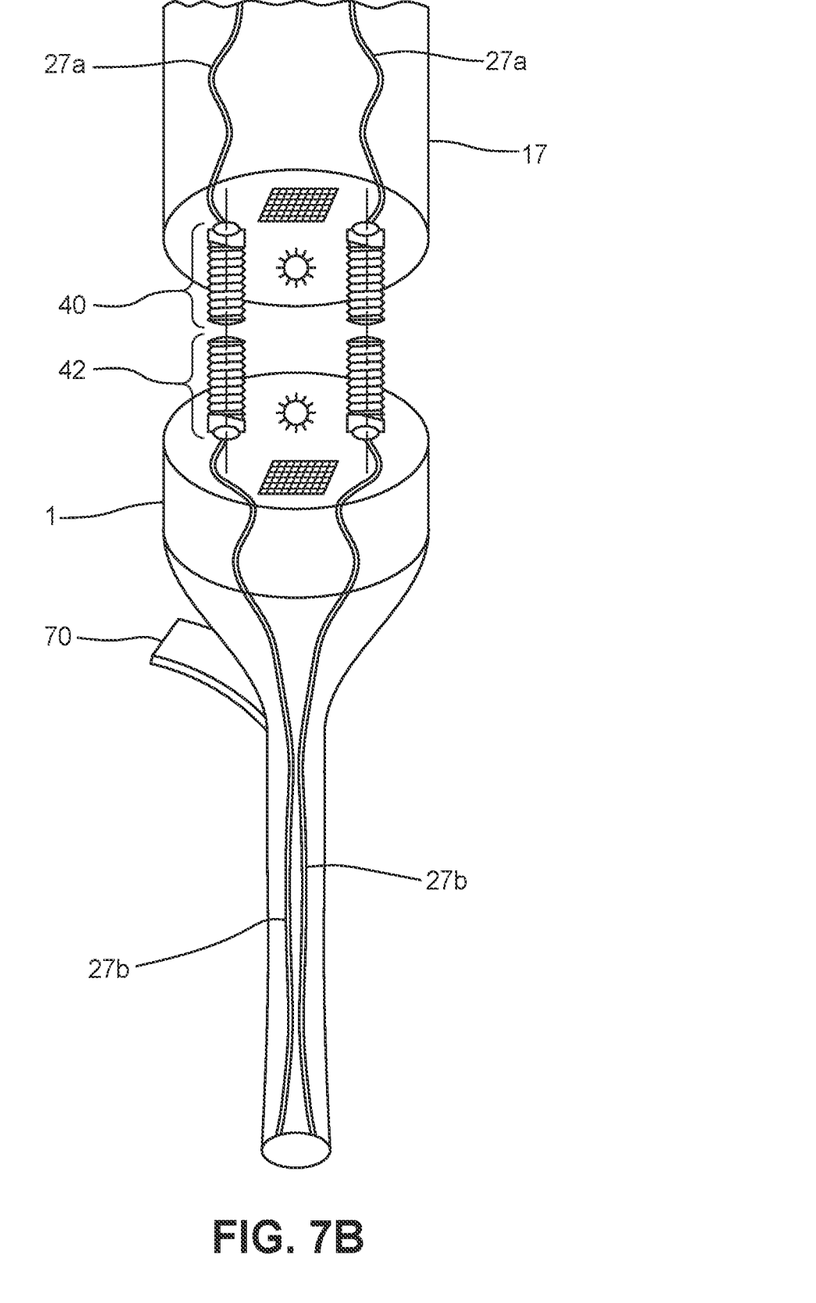
FIG. 7B is a side perspective view of a threaded connection embodiment between the handle and sheath.

FIG. 7B shows a handle threaded connector 40 and a sheath threaded connector 42 in accordance with some embodiments of the invention.

Figure 7C:
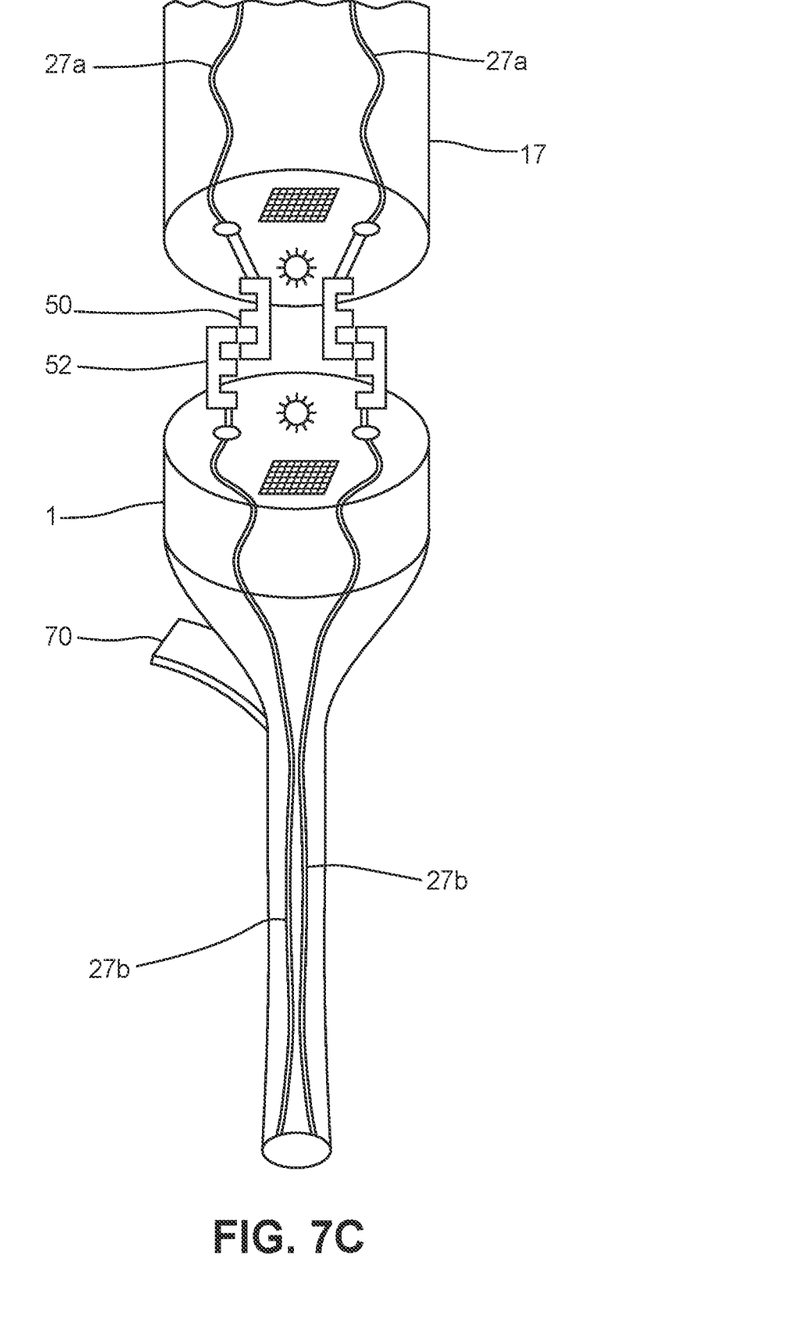
FIG. 7C is a side perspective view of opposing gears connection embodiment between the handle and sheath.

FIG. 7C shows a handle gear assembly 50 mating with a sheath gear assembly 52 in accordance with some embodiments of the invention.

Figure 7D:
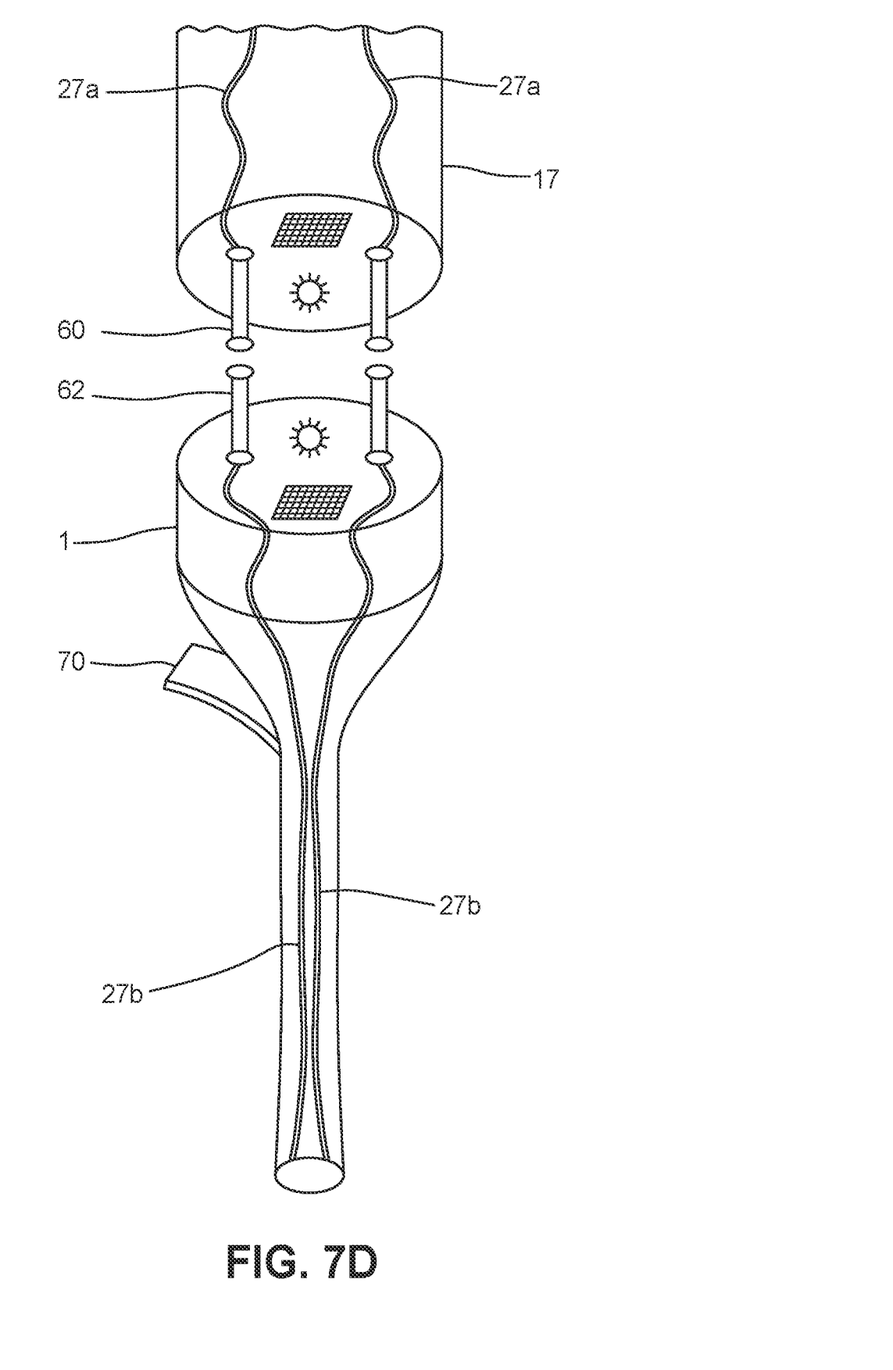
FIG. 7D is a side perspective view of a magnetic coupler connection embodiment between the handle and sheath.

FIG. 7D shows a handle magnet 60 and a sheath magnet 62 in accordance with some embodiments of the invention. A strong earth magnet such as Neodynium magnets are preferred.

Figure 7E:
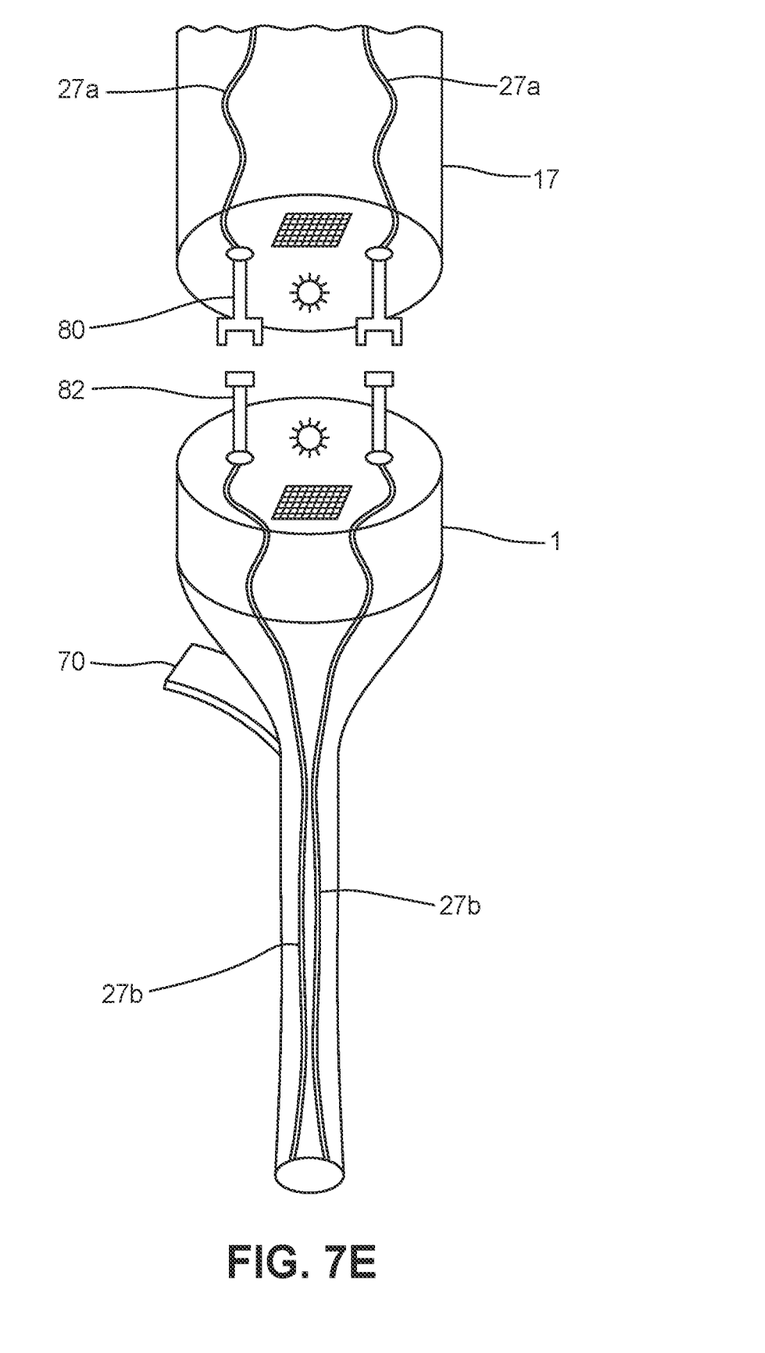
FIG. 7E is a side perspective view of a male/female connection embodiment between the handle and sheath.

FIG. 7E shows a locking connection in which a female connector 80 on the handle 17 mates with a male connector 82 on the sheath 1 in accordance with some embodiments of the invention. As with the ball and socket, the male/female ends may be placed on handle 17 and sheath 1 or sheath 1 and handle 17.

Figure 7F:
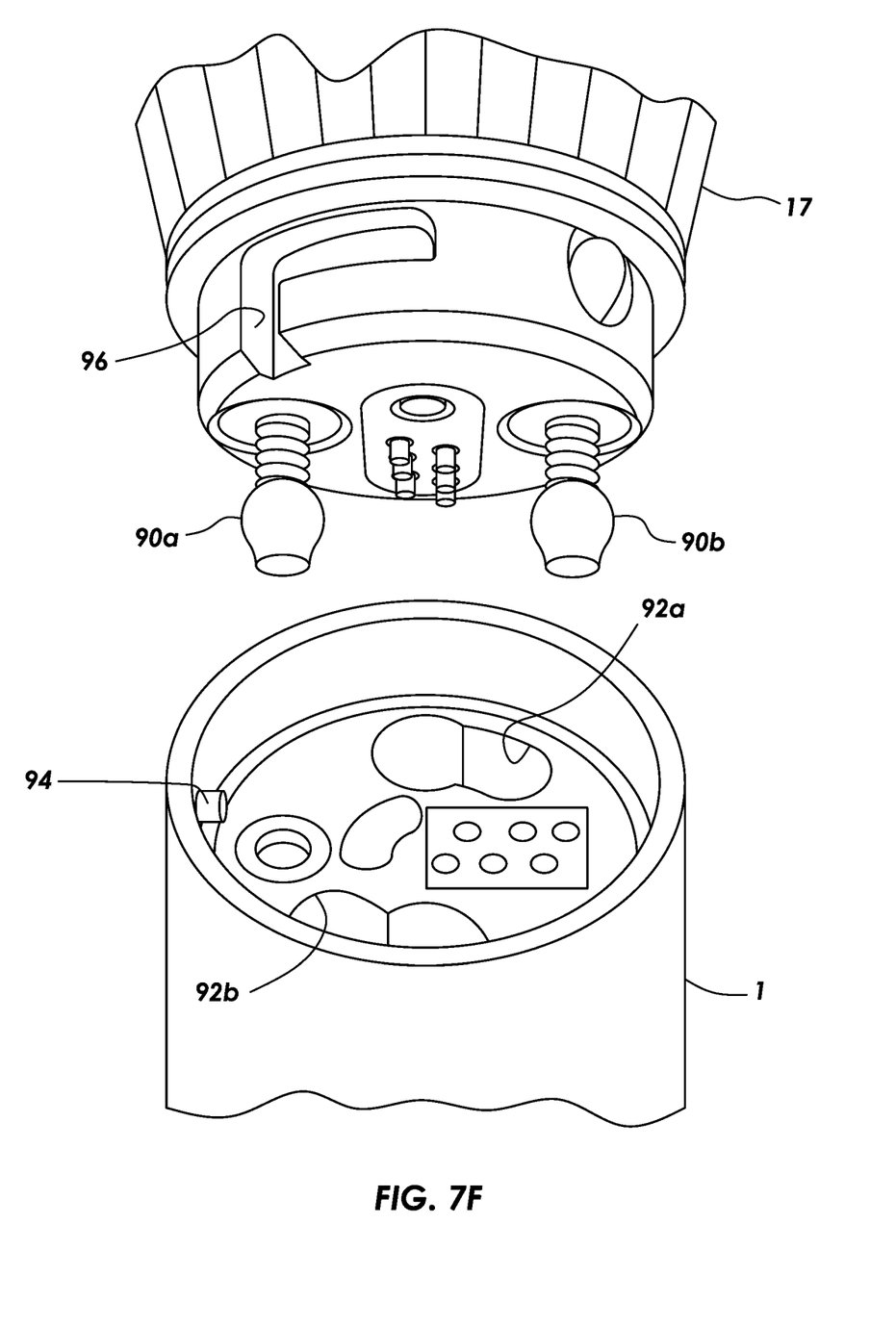
FIG. 7F is a side perspective view of a male/female bayonet connection embodiment between the handle and sheath.

FIG. 7F shows a bayonet connection that includes a tab or pin 94 in the sheath 1 and a groove 96 in the handle 17 in accordance with some embodiments of the invention. In accordance with some other embodiments of the invention, the tab 94 is cylindrical in shape. In accordance with some other embodiments of the invention, the tab 94 is rectangular in shape. In accordance with some other embodiments of the invention, the tab 94 is in the handle 17 and the groove 96 is in the sheath 1. The location of the tab 94 and the groove 96 is arbitrary and can be switched between the handle 17 and the sheath 1. To engage the handle 17 with the sheath 1, the tab 94 is aligned with the groove 96 and the sheath 1 is pressed toward the handle 17. Then the sheath 1 is rotated in one direction while the handle 17 is rotated in the opposite direction to cause the sheath 1 and the handle 17 to engage each other. As such, connectors 90*a* and 90*b* engage the slots 92*a* and 92*b*, respectively. In accordance with some aspects and embodiments of the invention, the connectors and slots form a ball and socket, similar to FIG. 7A. The connectors and the slots are connected to the pull wire (pair 27*a* and pair 27*b*—not shown in FIG. 7F) and provide the ability to control the tip 4 when the handle 17 and the sheath 1 are connected. In accordance with various aspects and embodiments of the invention, as the handle 17 and sheath 1 are engaged and lock, so does the angular wire engage for control of the tip 4. Additionally, the locking of the handle 17 to the sheath 1 also couples or connects electrical connections and optical are created, for example for the LED, depend on location of the LED as discussed with respect to the various aspects and embodiments of the invention.

Figure 6:
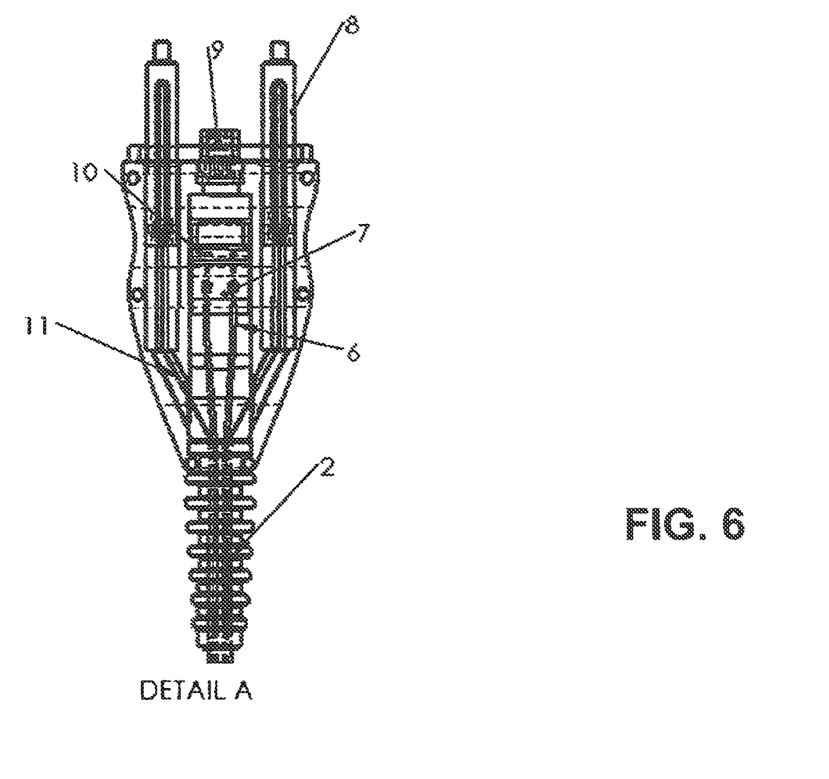
FIG. 6 is a cross section of the coupler proximate end of the sheath (detail A from FIG. 4).

As shown in FIGS. 3 and 6, the handle 17 and sheath 1 can be joined to form a linked instrument, with the connectors illustrated in FIGS. 7A-7F contained within the housing of the instrument. In each connection embodiment shown, the ends of wires 27*b* are affixed at the tip 4.

With reference to FIG. 6, the detail of the proximal coupling end of the sheath 1 is shown. Strain relief 2 adds flexibility and strength to this element. The sheath electrical connector 9 allows mating with the handle electrical connector 26 to provide the required power for and signal transmission for the elements (e.g. image sensor and LEDs). The LED support block 7 supports an LED PCB 10 configured to provide light into light fiber bundles 6. These fibers terminate at the sheath tip, as shown in FIG. 5.

The handle will house the integrated LED(s) for designs that integrate a light fiber bundle in the sheath. In other designs where no light fiber bundles are used, the LED(s) will be positioned at the distal end or tip of the endoscope. As shown in FIG. 6, the LEDs are positioned in the proximal end of the sheath 1, and a light fiber is used to carry the light to the distal tip of the sheath 1.

The steering pull wire 11 is shown within a threaded mating 8 in accordance with some embodiments of the invention. Threaded mating 8 screws into a receiving threaded receptacle on the handle, affixing the handle and sheath 1 together.

Various Connections

To ensure complete endoscope function, there will be between the handle and the sheath the following connections based on the various embodiments of the invention:

The embodiment shown will have an electronic connection between the wires emanating from the CMOS sensor of the sheath 1 to the wires from the AC power (or if wireless, a rechargeable battery included on the sheath 1). In one non-limiting example, the wires from the sensor carry both the power and image transmission signal. LED(s) exiting the handle or proximal end of the sheath 1 will be positioned within a specified/optimized distance to the light fiber bundles within the sheath (or for endoscopes not utilizing light fiber bundles the LED(s) will be positioned at the distal end or tip of the endoscope where a special mating connection will be designed so that the electrical connection between the LED(s) wires within the proximal end of the sheath are mated to the powered wires emanating from the distal end of the handle). The power will be supplied by AC power (or if wireless, rechargeable battery).

In accordance with some embodiments and aspects of the invention, the image processing unit of the endoscope includes features that allow use of the endoscope as a uroPod or gynePod. In accordance with some embodiments and aspects of the invention, the LED can be adjustable, both in intensity and in wavelength, thereby allowing for wavelength selection to improve use of the endoscope. For example, the use of wavelength adjustment (e.g. narrow band imaging) allows for better detection of blood vessels below skin level. In accordance with some embodiments and aspects of the invention, the endoscope allows for image focusing, image enhancement, image magnification and calibration.

The novel connection between the angulation wires within the sheath and the angulation wires and controlling actuator of the handle (as described above with respect to FIGS. 7A-7F) will control the tip deflection of the endoscope once the two components such as handle and sheath are mated.

The sheath design can be rigid, semi-rigid, or flexible with or without an active endoscope distal end tip deflection. The sheath will incorporate or integrate single or multi-channels depending on endoscope design and application. The CMOS sensor with complementary objective lens will be positioned at the distal end of the endoscope. The LED(s) will also be positioned at the distal end of the endoscope (unless the LED(s) are positioned within the distal end of the handle or proximal end of the sheath in which case, there will be a minimum of one or more light fiber bundles integrated within the sheath 1 and exiting both ends of the sheath 1 or mated to an LED within the proximal end of the sheath 1).

All image signals will be processed and transmitted to an integrated display monitor and/or to an external unattached display monitor.

Operation of Modular Endoscope

This endoscope design is a 'plug & play' system. In a wired configuration, select a handle, choose a sheath for the intended application, snap these two components together, connect to desired display/monitor, and plug into a power source and camera control unit (ccu), unless it is a wireless endoscope design. Turn on the system and begin your procedure.

Upon procedure completion, reprocess components according to standard Association of periOperative Registered Nurses (AORN) operating room reprocessing procedures or if an office setting, adhere to minimum reprocessing requirements. If the sheath is disposable, follow standard biohazard disposal standards.

Certain methods and sets of operations as described herein may be performed by instructions that are stored upon a non-transitory computer readable medium. The non-transitory computer readable medium stores code comprising instructions that, if executed by one or more computers, would cause the computer to perform steps of methods described herein. The non-transitory computer readable medium may include one or more of a rotating magnetic disk, a rotating optical disk, a flash random access memory (RAM) chip, and other mechanically moving or solid-state storage media.

Certain embodiments have been described herein and it will be noted that different combinations of different components from different non-limiting examples may be possible. Salient features are presented to better explain examples; however, it is clear that certain features may be added, modified and/or omitted without modifying the functional aspects of these non-limiting examples as described. Additionally, it is intended that such equivalents include both currently known equivalents and equivalents developed in the future, i.e., any elements developed that perform the same function, regardless of structure. The scope of the invention, therefore, is not intended to be limited to the exemplary embodiments shown and described herein.

Various non-limiting example embodiments use the behavior of either (or a combination of) humans and machines. Method examples are complete wherever in the world most constituent steps occur. Some examples are one or more non-transitory computer readable media arranged to store such instructions for methods described herein. Whatever machine holds non-transitory computer readable media comprising any of the necessary code may implement an example. Some non-limiting examples may be implemented as: physical devices such as semiconductor chips; hardware description language representations of the logical or functional behavior of such devices; and one or more non-transitory computer readable media arranged to store such hardware description language representations. Descriptions herein reciting principles, aspects, and embodiments encompass both structural and functional equivalents thereof.

Practitioners skilled in the art will recognize many possible modifications and variations. The modifications and variations include any relevant combination of the disclosed features. Descriptions herein reciting principles, aspects, and examples encompass both structural and functional equivalents thereof. Elements described herein as "coupled" or "communicatively coupled" have an effectual relationship realizable by a direct connection or indirect connection, which uses one or more other intervening elements. Examples described herein as "communicating" or "in communication with" another device, module, or elements include any form of communication or link. For example, a communication link may be established using a wired connection, wireless protocols, near-field protocols, or RFID.

Unless defined otherwise, all technical and scientific terms used herein have the same meaning as commonly understood by one of ordinary skill in the art to which this invention belongs. The verb couple, its gerundial forms, and other variants, should be understood to refer to either direct connections or operative manners of interaction between elements of the invention through one or more intermediating elements, whether or not any such intermediating element is recited. Any methods and materials similar or equivalent to those described herein can also be used in the practice of the invention. Representative illustrative methods and materials are also described.

All publications and patents cited in this specification are herein incorporated by reference as if each individual publication or patent were specifically and individually indicated to be incorporated by reference and are incorporated herein by reference to disclose and describe the methods and/or system in connection with which the publications are cited. The citation of any publication is for its disclosure prior to the filing date and should not be construed as an admission that the invention is not entitled to antedate such publication by virtue of prior invention. Further, the dates of publication provided may be different from the actual publication dates which may need to be independently confirmed.

In accordance with the teaching of the invention a computer and a computing device are articles of manufacture. Other non-limiting examples of an article of manufacture include: an electronic component residing on a mother board, a server, a mainframe computer, or other special purpose computer each having one or more processors (e.g., a Central Processing Unit, a Graphical Processing Unit, or a microprocessor) that is configured to execute a computer readable program code (e.g., an algorithm, hardware, firmware, and/or software) to receive data, transmit data, store data, or perform methods.

The article of manufacture (e.g., computer or computing device) includes a non-transitory computer readable medium or storage that may include a series of instructions, such as computer readable program steps or code encoded therein. In certain aspects of the invention, the non-transitory computer readable medium includes one or more data repositories. Thus, in certain embodiments that are in accordance with any aspect of the invention, computer readable program code (or code) is encoded in a non-transitory computer readable medium of the computing device. The processor or a module, in turn, executes the computer readable program code to create or amend an existing computer-aided design using a tool. The term "module" as used herein may refer to one or more circuits, components, registers, processors, software subroutines, or any combination thereof. In other aspects of the embodiments, the creation or amendment of the computer-aided design is implemented as a web-based software application in which portions of the data related to the computer-aided design or the tool or the computer readable program code are received or transmitted to a computing device of a host.

An article of manufacture or system, in accordance with various aspects of the invention, is implemented in a variety of ways: with one or more distinct processors or microprocessors, volatile and/or non-volatile memory and peripherals or peripheral controllers; with an integrated microcontroller, which has a processor, local volatile and non-volatile memory, peripherals and input/output pins; discrete logic which implements a fixed version of the article of manufacture or system; and programmable logic which implements a version of the article of manufacture or system which can be reprogrammed either through a local or remote interface. Such logic could implement a control system either in logic or via a set of commands executed by a processor.

The scope of the invention, therefore, is not intended to be limited to the non-limiting examples shown and described herein. Rather, the scope and spirit of present invention is embodied by the appended claims.

What is claimed is:

1. A modular endoscope comprising:
   a handle including a first portion of a tip deflecting mechanism;
   a sheath including a second portion of the tip deflecting mechanism and the sheath having a coupling end and a tip end; and
   a bayonet coupling mechanism including:
      a tab positioned in the coupling end of the sheath;
      a groove defined in the handle;
      a pair of connectors; and
      a pair of slots,
      wherein the tab is inserted into the groove and the sheath is rotated relative to the handle to cause the handle and the sheath to releasably engage and wherein the pair of connectors engage the pair of slots upon rotation so that the pair of connectors and the pair of slots engage to form the tip deflecting mechanism,
   wherein releasably engaging the handle and the sheath causes the first portion and the second portion of the tip deflecting mechanism to engage thereby allowing the tip end to be controlled from the handle using the tip deflecting mechanism and causing angular deflection of the tip end.

2. The endoscope of claim 1 further comprising an illumination source configured to provide light projected from the tip end.

3. The endoscope of claim 2, wherein the illumination source includes:
   an LED at the tip end;
   a power source for the LED; and
   an actuator for turning on the LED.

4. The endoscope of claim 3, wherein said actuator includes a wireless connection.

5. The endoscope of claim 1, further comprising an image sensor mounted on the tip end of the sheath and configured to capture image data from in front of the tip end.

6. The endoscope of claim 1, wherein the sheath includes an auxiliary channel having:
   a first end proximate to the coupling end of the sheath; and
   a second end terminating at the tip end of the sheath,
   wherein the auxiliary channel allows fluid, gas, or a surgical tool to be introduced at the first end of the auxiliary channel and emerge at the tip end.

7. The endoscope of claim 1, wherein the tip deflecting mechanism is configured to allow up to 280 degree deflection of the tip.

8. The endoscope of claim 1, further comprising an LED embedded in the tip end.

9. A modular endoscope comprising:
   a handle including a first portion of a tip deflecting mechanism;
   a sheath including a second portion of the tip deflecting mechanism and the sheath having a coupling end and a tip end; and
   a bayonet coupling mechanism including:
      a groove defined in the coupling end of the sheath;
      a tab in the handle;
      a pair of connectors; and
      a pair of slots,
      wherein the tab is inserted into the groove and the sheath is rotated relative to the handle to cause the handle and the sheath to releasably engage and wherein the pair of connectors engage the pair of slots upon rotation so that the pair of connectors and the pair of slots engage to form the tip deflecting mechanism,
      wherein the tab is inserted into the groove to cause the handle and the sheath to releasably engage,
   wherein releasably engaging the handle and the sheath causes the first portion and the second portion of the tip deflecting mechanism to engage thereby allowing the tip end to be controlled from the handle using the tip deflecting mechanism and causing angular deflection of the tip end.

10. The endoscope of claim 9 further comprising an illumination source configured to provide light projected from the tip end.

11. The endoscope of claim 10, wherein the illumination source includes:
    an LED at the tip end;
    a power source for the LED; and
    an actuator for turning on the LED.

12. The endoscope of claim 11, wherein the actuator includes a wireless connection.

13. The endoscope of claim 11, wherein the LED's wavelength can be adjusted.

14. The endoscope of claim 10, further comprising an image sensor mounted on the tip end of the sheath and configured to capture image data from in front of the tip end.

15. The endoscope of claim 10, wherein the illumination source includes:
    an LED in the handle;
    a light fibers positioned to conduct light from the LED in the handle to the tip; and
    a window allowing light from the LED to be projected from the tip.

16. The endoscope of claim 10, wherein the sheath includes an auxiliary channel having:
    a first end proximate to the coupling end of the sheath; and
    a second end terminating at the tip end of the sheath,
    wherein the auxiliary channel allows any of fluid, gas, air, and a surgical tool to be introduced at the first end of the auxiliary channel and emerge at the tip end.

17. The endoscope of claim 10, wherein the tip deflecting mechanism is configured to allow up to 280 degree deflection of the tip.

18. The endoscope of claim 10, wherein the illumination source includes an LED embedded in the tip end.

* * * * *